US012786390B2

(12) United States Patent
Naruko et al.

(10) Patent No.: US 12,786,390 B2
(45) Date of Patent: Nov. 3, 2026

(54) COMPUTER SYSTEM, NON-TRANSITORY COMPUTER-READABLE STORAGE MEDIUM, AND DATA COMPRESSION METHOD

(71) Applicant: Hitachi, Ltd., Tokyo (JP)

(72) Inventors: Takahiro Naruko, Tokyo (JP); Hiroaki Akutsu, Tokyo (JP)

(73) Assignee: Hitachi, Ltd., Tokyo (JP)

(*) Notice: Subject to any disclaimer, the term of this patent is extended or adjusted under 35 U.S.C. 154(b) by 71 days.

(21) Appl. No.: 19/088,319

(22) Filed: Mar. 24, 2025

(65) Prior Publication Data

US 2025/0324045 A1 Oct. 16, 2025

(30) Foreign Application Priority Data

Apr. 12, 2024 (JP) ................................ 2024-064561

(51) Int. Cl.
*H04N 19/115* (2014.01)
*H04N 19/117* (2014.01)
*H04N 19/172* (2014.01)

(52) U.S. Cl.
CPC ......... *H04N 19/115* (2014.11); *H04N 19/117* (2014.11); *H04N 19/172* (2014.11)

(58) Field of Classification Search
CPC .................................................... H04N 19/115
USPC ..................................................... 375/240.02
See application file for complete search history.

(56) References Cited

U.S. PATENT DOCUMENTS

| | | | | | |
|---|---|---|---|---|---|
| 9,049,451 | B2 * | 6/2015 | Pun | ........................ | H04N 19/44 |
| 10,681,363 | B2 * | 6/2020 | Yang | ...................... | H04N 19/52 |
| 2020/0301595 | A1 | 9/2020 | Akutsu et al. | | |
| 2022/0365699 | A1 | 11/2022 | Akutsu et al. | | |
| 2023/0403393 | A1 * | 12/2023 | Zhao | ...................... | H04N 19/11 |
| 2024/0163481 | A1 * | 5/2024 | Zhao | ...................... | H04N 19/61 |

FOREIGN PATENT DOCUMENTS

JP 2020-155071 A 9/2020

* cited by examiner

*Primary Examiner* — Yulin Sun
(74) *Attorney, Agent, or Firm* — PROCOPIO, CORY, HARGREAVES & SAVITCH LLP

(57) ABSTRACT

Computer system configured to: calculate, by using object type definition data defining an object type as a detection target in a space defined by a dimension of processing data extracted in a plane of the dimension from multidimensional data as a compression target, a first feature of the object type; acquire the processing data and calculate a second feature of the processing data; estimate an important region of the space of the processing data, in which the object type exists, by using the first feature and the second feature; generate compression level information including a parameter for determining a data amount of each of the important region and a region other than the important region; and generate compressed data by converting the processing data to a data format of which compatibility is ensured with a transmission destination of the compressed data by lossy compression using the compression level information.

20 Claims, 11 Drawing Sheets

331
| DATA GENERATION SOURCE ID (401) | DOWNSCALING FACTOR (402) | DOWNSCALING ALGORITHM (403) |
|---|---|---|
| A | 1/16 | Bilinear |
| ⋮ | ⋮ | ⋮ |
FIG. 4
332
| DATA GENERATION SOURCE ID (501) | OBJECT TYPE ID (502) |
|---|---|
| A | obj1 |
| A | obj2 |
| ⋮ | ⋮ |
FIG. 5
333
| | OBJECT TYPE ID (601) | OBJECT TYPE FEATURE (602) | IMAGE QUALITY PARAMETER (603) | PERIPHERAL PARAMETER (604) |
|---|---|---|---|---|
| 611 | obj1 | 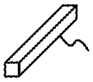 521 | High | 10 |
| 612 | obj2 |  522 | Mid | 20 |
| | ⋮ | ⋮ | ⋮ | ⋮ |
FIG. 6

COMPUTER SYSTEM, NON-TRANSITORY COMPUTER-READABLE STORAGE MEDIUM, AND DATA COMPRESSION METHOD

CLAIM OF PRIORITY

The present application claims priority from Japanese patent application JP 2024-064561 filed on Apr. 12, 2024, the content of which is hereby incorporated by reference into this application.

BACKGROUND OF THE INVENTION

This invention relates to a compression technology for reducing a data size.

Lossy compression technologies with a high compression ratio are demanded from a viewpoint of reducing the cost required for accumulation and transfer of data. Those lossy compression technologies are further demanded to have high efficiency from a viewpoint of suppressing the calculation cost required for compression, as well as a high compression ratio. Compressed data generated by a lossy compression technology is desirably compliant with a data format commonly used from a viewpoint of compatibility.

Known examples of the lossy compression technology for video data include Advanced Video Coding (AVC), High Efficiency Video Coding (HEVC), and Versatile Video Coding (VVC), which are standardized compression technologies.

There is known a technology that controls the bit allocation amount of multidimensional data for each region based on specification by a user by using a deep neural network (DNN) such as an autoencoder, to generate compressed data (paragraphs 0169 to 0178 of JP 2020-155071 A).

In data for industrial applications, it may be unnecessary to reproduce all information contained in the data with high fidelity after compression and expansion. For example, in a case of inspecting a power transmission tower by using video data taken by a drone, a region in which the power transmission tower is shown is required to have a high image quality, whereas deterioration of image quality is allowable in a region of the background in which vegetation or the like is shown. According to JP 2020-155071 A, the bit allocation amount is controlled in such a manner that the image quality of the region in which an object type, such as the power transmission power, exists is high, and other regions are highly compressed, and it is thus possible to achieve generation of data with a high compression ratio which is suitable for the application.

SUMMARY OF THE INVENTION

The technology as disclosed in JP 2020-155071 A can be expected to achieve a high compression ratio. However, it is determined by learning what bit string the DNN generates as compressed data, and thus there is a problem in that the compressed data generated by the lossy compression technology as disclosed in JP 2020-155071 A is not compatible with a data format commonly used, such as AVC (problem 1).

A representative example of the present invention disclosed in this specification is as follows: a computer system comprises a processor, a storage device coupled to the processor, and a coupling device, coupled to the processor, for being coupled to an external device. The processor is configured to execute: first processing of calculating, by using object type definition data defining an object type as a detection target in a space defined by a dimension of processing data extracted in a plane of the dimension from multidimensional data as a compression target, a first feature of the object type; second processing of acquiring the processing data and calculating a second feature of the processing data; third processing of estimating an important region of the space of the processing data, in which the object type exists, by using the first feature and the second feature; fourth processing of generating compression level information including a parameter for determining a data amount of each of the important region and a region other than the important region; and fifth processing of generating compressed data by converting the processing data to a data format of which compatibility is ensured with a transmission destination of the compressed data by lossy compression using the compression level information.

According to this invention, it is possible to efficiently generate compressed data of which compatibility with a transmission destination is ensured. Problems, configurations, and effects other than those described above become apparent from the following description of at least one embodiment.

BRIEF DESCRIPTION OF THE DRAWINGS

The present invention can be appreciated by the description which follows in conjunction with the following figures, wherein:

FIG. 4 is a table for showing an example of the data structure of the pre-processing parameter management information 331 in the first embodiment;

FIG. 5 is a table for showing an example of the data structure of the object type information 332 in the first embodiment;

FIG. 6 is a table for showing an example of the data structure of the object type definition information 333 in the first embodiment;

DETAILED DESCRIPTION OF THE PREFERRED EMBODIMENTS

Figure 1:
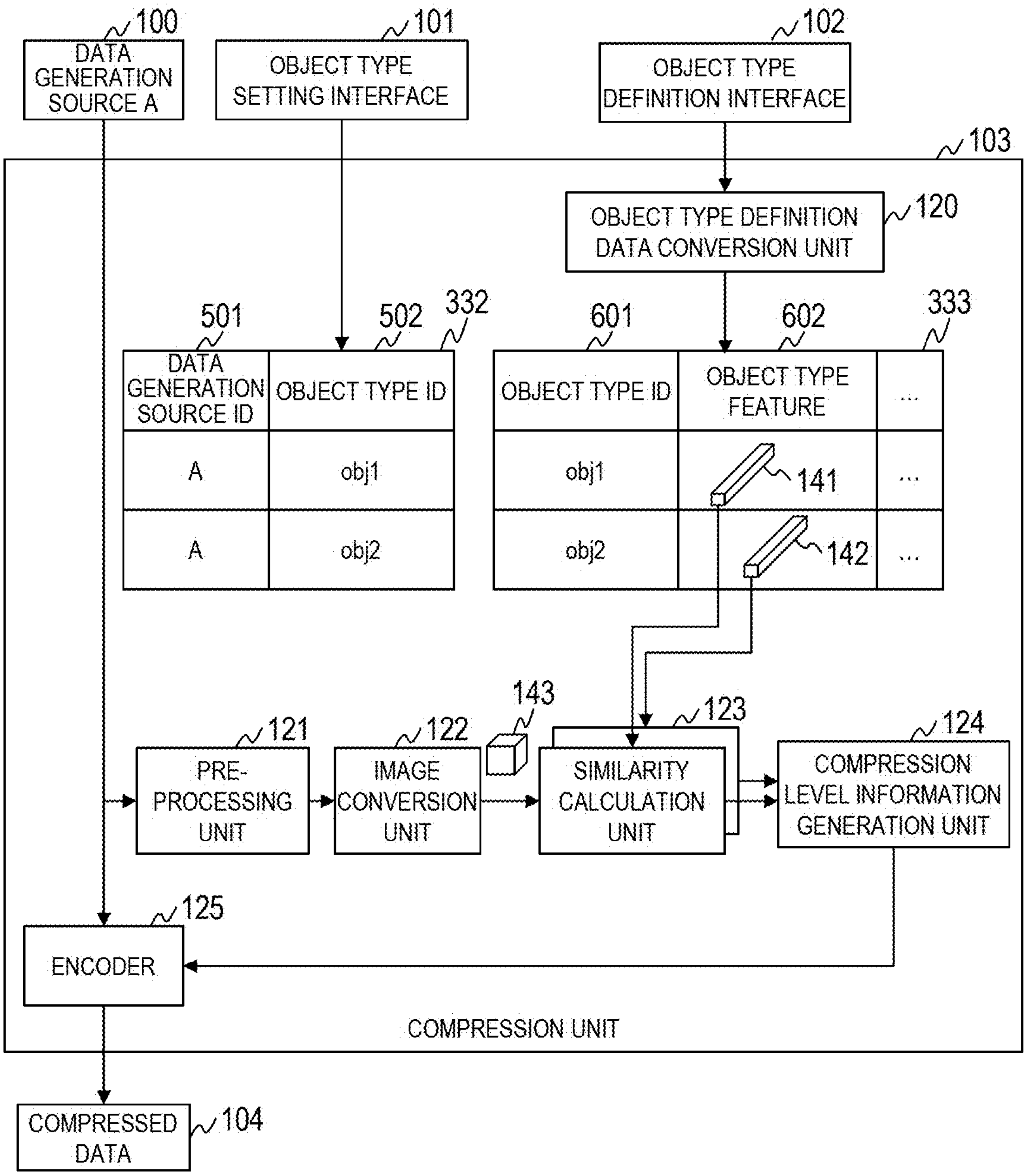
FIG. 1 is an explanatory diagram of the outline of the system of the first embodiment.

The technology as described in JP 2020-155071 A has the following problems in addition to the above-mentioned problem. (Problem 2) Definition of the type of an object (an object type) and the bit allocation amount for each region are hard-coded as trained parameters of the DNN, and therefore in a case where the definition of the object type is changed, a large amount of learning data including training data indicating the object type is required, and re-learning takes time. (Problem 3) The DNN has a slow compression rate because the DNN receives input of high-resolution original data, determines the bit allocation amount, and generates compressed data. In a case of using a convolutional neural network as the DNN, for example, the calculation amount of the convolutional neural network increases in proportion to the resolution of the input, in general. Accordingly, it takes a lot of time to process high-resolution data such as Full-HD data and 4K data.

Now, referring to the drawings, description is given of embodiments of this invention for solving the three problems. It should be noted that this invention is not to be construed by limiting the invention to the content described in the following embodiments. A person skilled in the art would easily recognize that a specific configuration described in the following embodiments may be changed within the scope of the concept and the gist of this invention.

In configurations of the at least one embodiment of this invention described below, the same or similar components or functions are denoted by the same reference numerals, and a redundant description thereof is omitted here.

First Embodiment

First, an outline of a system of a first embodiment of this invention is described with reference to FIG. 1. FIG. 1 is an explanatory diagram of the outline of the system of the first embodiment.

The system of the first embodiment is configured from a data generation source 100, an object type setting interface 101, an object type definition interface 102, and a compression unit 103.

The data generation source 100 is a subject that generates multidimensional data as a compression target, and is an image sensor that generates video data, for example. The video data has a space, time, and a channel as dimensions. A frame (an image) is data extracted from the video data in a time plane. In the first embodiment, a case in which the data generation source 100 is an image sensor that generates video data is described as an example.

The data generation source 100 and the generated data are not limited thereto, and may be, for example, an image sensor that generates still image data, a vibration sensor that generates one-dimensional time-series data, or the like. The data generation source 100 is not limited to a sensor, and may be software that generates video data and still image data, such as computer graphics software. The data of the data generation source 100 may be data obtained by processing data generated by a sensor, software, or the like, for example, a segmentation map obtained by applying a machine learning model of semantic segmentation to each frame of video data. The data of the data generation source 100 may be a video file or the like stored in a recording device. A plurality of the data generation sources 100 may be provided.

The object type setting interface 101 is an interface for enabling a user to specify the type of an object (an object type) as a detection target, wherein the object type is, for example, a person, a vehicle, a road, a steel tower, a building, and the like. Information on the specified object type is managed as object type information 332. In the first embodiment, the compression unit 103 compresses each frame of video data generated by the data generation source 100 in such a manner that a region in which the specified object type exists has a high image quality, whereas a region in which that object type does not exist is highly compressed.

The object type information 332 stores therein an entry including a data generation source ID 501 and an object type ID 502. In the data generation source ID 501, an identifier representing the data generation source 100 is stored. In the object type ID 502, an identifier representing an object type is stored.

As illustrated in FIG. 1, a plurality of object types may be specified for one data generation source 100. However, the specified object type for one data generation source 100 may be one.

The object type definition interface 102 is an interface for inputting object type definition data 221 (illustrated in FIG. 2) defining a feature of an object type.

The compression unit 103 is a module that compresses multidimensional data generated by the data generation source 100. The compression unit 103 may generate compressed data 104 for each video frame or for every predetermined number of video frames, or may compress the entire video file to generate the compressed data 104. The compression unit 103 includes an object type definition data conversion unit 120, a pre-processing unit 121, an image conversion unit 122, a similarity calculation unit 123, a compression level information generation unit 124, and an encoder 125.

The object type definition data conversion unit 120 is a unit that converts object type definition data input by a user via the object type definition interface 102 to an object type vector (e.g., vectors 141 and 142 in FIG. 1) that is a feature representing the corresponding object type. Although the object type vector is typically a one-dimensional vector, the object type vector is not limited thereto, and may be data of any data structure, for example, a tensor with two or more dimensions or an associative array.

The object type vector calculated by the object type definition data conversion unit 120 is stored in object type definition information 333.

The object type definition information 333 stores therein an entry including an object type ID 601 and an object type feature 602. In the object type ID 601, an identifier representing an object type is stored. In the object type feature 602, an object type vector that is a feature of the object type is stored. The entry may include a field for managing a parameter that sets an image quality of a region in which an object corresponding to the object type exists, for example.

By combining the object type information 332 and the object type definition information 333 with each other, the object type feature 602 corresponding to each data generation source ID 501 can be managed. For example, the object type information 332 and the object type definition information 333 illustrated in FIG. 1 show that the object type vectors 141 and 142 correspond to a data generation source ID "A".

In a case of acquiring video data as a compression target, the compression unit 103 inputs a frame of the data (hereinafter referred to as "original frame") to the pre-processing unit 121. The pre-processing unit 121 performs pre-processing, such as downscaling, on the input original frame to generate a processed frame with a changed resolution or the like.

The image conversion unit 122 calculates an image feature 143 of the processed frame from the processed frame. The image feature is, for example, a tensor.

The similarity calculation unit 123 calculates similarity between the image feature 143 and an object type vector. The output is, for example, a two-dimensional array representing the detection result of the object type represented by the object type vector.

The compression level information generation unit 124 calculates compression level information for each unit of compression by the encoder 125 based on the output of the similarity calculation unit 123.

The encoder 125 compresses the original frame based on the compression level information generated by the compression level information generation unit 124 to generate compressed data 104. The encoder 125 is, for example, an encoder for a standardized video codec such as AVC. The encoder 125 is not limited to the above-mentioned software encoder, and may be an HEVC encoder or may be a hardware encoder.

The compression level information is a parameter of the encoder 125 which controls the bit allocation amount for each region. In a case in which the encoder 125 is an encoder compliant with AVC, the unit of compression by the encoder 125 is a macroblock, and the compression level information is a value of a quantization parameter (QP value) for each macroblock, difference information of a QP value for each macroblock, information specifying the degree of enhancement of image quality for each macroblock, and the like. In this case, regarding the output of the similarity calculation unit 123, for example, the compression level information generation unit 124 calculates the maximum value of a probability for each macroblock and generates information on a spatial distribution of QP values in which a predetermined QP value is assigned to a macroblock for which the maximum value is larger than a predetermined threshold value and a relatively larger predetermined QP value is assigned to another macroblock, as the compression level information. The above-mentioned compression level information is merely an example, and is not limited thereto.

The object type definition data conversion unit 120, the image conversion unit 122, and the similarity calculation unit 123 are units included in a machine learning model of semantic segmentation using the technology of few-shot learning or zero-shot learning, for example.

Figure 2:
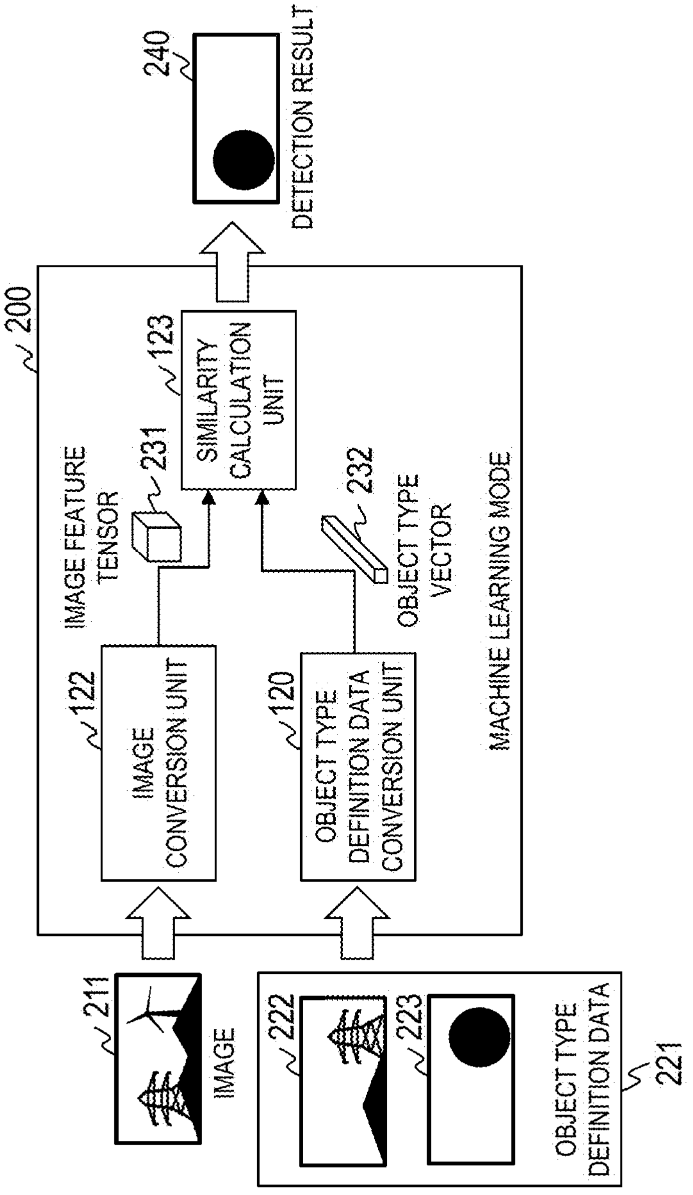
FIG. 2 shows an example of a machine learning model 200 of semantic segmentation using a related-art technology of few-shot learning.

FIG. 2 shows an example of a machine learning model 200 of semantic segmentation using a related-art technology of few-shot learning.

The machine learning model 200 uses an image 211 and object type definition data 221 as inputs, and outputs a detection result 240 of a region in which an object corresponding to the object type specified by the object type definition data 221 exists in the image 211.

FIG. 2 shows the object type definition data 221 for setting a power transmission tower as an object type, the object type definition data 221 being configured from an image 222 showing the power transmission tower and a mask image 223 representing a region in which the power transmission tower exists in that image. It suffices that at least one piece of object type definition data 221 is provided for one object type. A plurality of pieces of object type definition data 221 may be provided for one object type.

The image 211 is converted to an image feature 231 by the image conversion unit 122. The image conversion unit 122 is a convolutional neural network such as a residual network (ResNet), and converts the image 211 to a three-dimensional tensor consisting of spatial (vertical, horizontal) and channel dimensions.

The image conversion unit 122 is not limited thereto, and may be a vision encoder using a transformer such as Contrastive Language-Image Pre-Training (CLIP), a neural network having another structure, or any other processing module.

The object type definition data conversion unit 120 calculates an object type vector 232 representing the object type by using the image 222 and the mask image 223 included in the object type definition data 221. The object type definition data conversion unit 120 is, for example, a neural network such as the ResNet, converts the image 222 to a three-dimensional tensor consisting of spatial (vertical, horizontal) and channel dimensions, and applies average pooling in the spatial direction to a region of the tensor, which is marked as the region of the object type in the mask image 223, to calculate an object type vector 232 representing that object type.

The object type definition data conversion unit 120 may calculate a vector representing the background by applying average pooling in the spatial direction to a region (background) of the tensor, which is not marked as the region of the object type in the mask image 223, and may use one set of the above-mentioned vector 232 representing the object type and the vector representing the background as the object type vector 232.

The object type definition data conversion unit 120 is not limited thereto, and may include, for example, a vision encoder using a transformer such as CLIP.

The similarity calculation unit 123 calculates, for each spatial position of the image feature 231, similarity to the object type vector 232 to output the detection result 240 of the object type. The similarity can be calculated by a cosine similarity, for example, but is not limited thereto.

In general, the machine learning model 200 of semantic segmentation is treated as one module configured from the image conversion unit 122, the object type definition data conversion unit 120, and the similarity calculation unit 123.

Accordingly, in a related-art implementation, it is required to provide the machine learning model 200 for each object type and thus, as the number of the object types increases, the calculation cost also increases, and speeding up of the processing becomes more difficult.

This invention employs the functional configuration illustrated in FIG. 1, thereby suppressing the increase in the calculation cost and improving the compression speed.

As illustrated in FIG. 2, the object type definition data conversion unit 120 uses the object type definition data 221 as its input and does not depend on the image 211. Thus, in the first embodiment, the object type definition data conversion unit 120 executes its processing in response to setting of the object type definition data via the object type definition interface 102 as a trigger and stores the result in the object type definition information 333. In other words, the object type definition data conversion unit 120 is arranged independently of the unit that performs frame compression processing.

As illustrated in FIG. 2, the image conversion unit 122 uses the image 211 as its input and does not depend on the object type definition data 221. Thus, in the first embodiment, the image conversion unit 122 executes its processing in response to the input of each processed frame as a trigger and saves the result in a cache. By saving the result in the cache, it is possible to use the result also in processing of detecting each object type.

The similarity calculation unit 123 calculates the similarity regarding each object type for one frame. This processing is for estimating a region in which the object type exists in the frame.

By employing the configuration illustrated in FIG. 1, the number of times of calculation can be reduced as compared to a naive implementation in which the machine learning model 200 is executed for each object type in each frame, and thus the compression speed is increased. The machine learning model 200 is executed in proportion to the number of the object types in a related-art implementation, and hence the effect of speed improvement is remarkable particularly in a case in which there are a plurality of object types.

The machine learning model 200 is not limited to the model described above and may be a deep learning model of object detection using a technology of the few-shot learning, for example.

The machine learning model 200 may also be a model to which a natural language (for example, a character string "power transmission tower") is input as the object type definition data 221. In this case, the object type definition data conversion unit 120 may be a text encoder that converts that character string to a tensor, for example.

Figure 3:
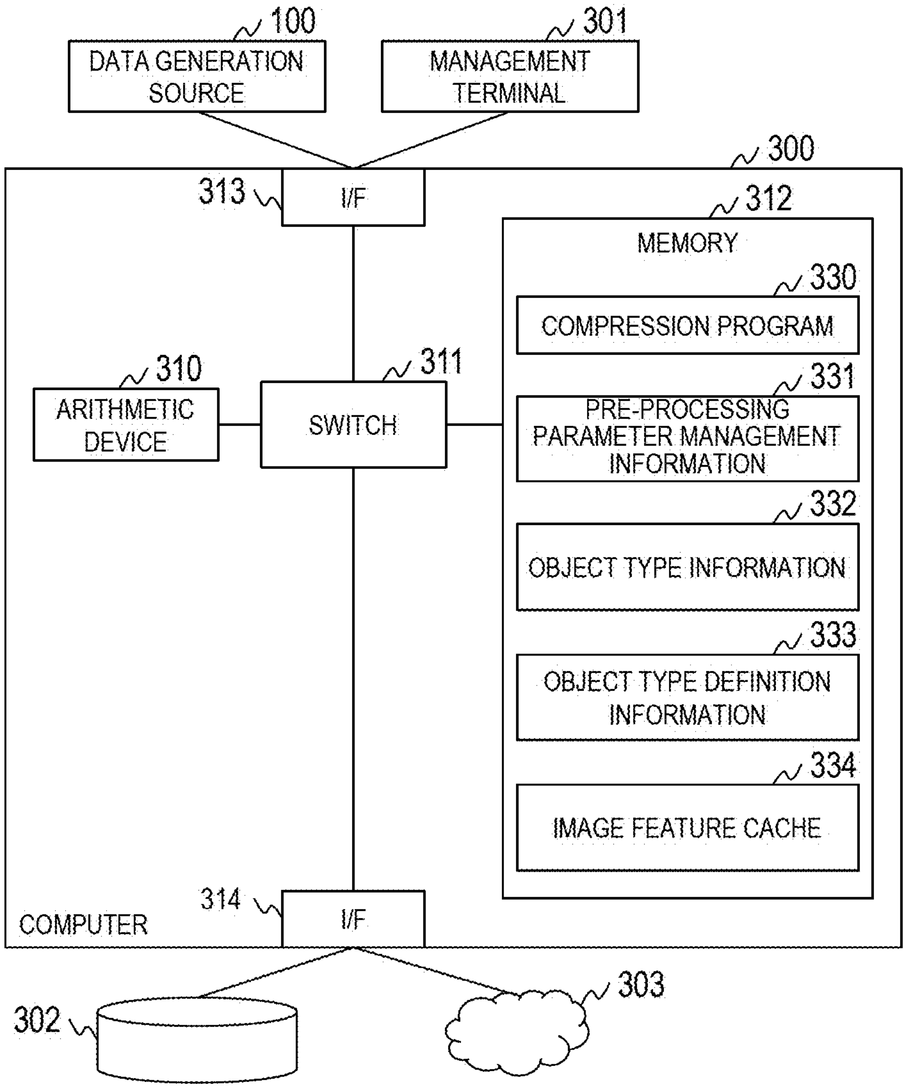
FIG. 3 is a diagram for illustrating an example of the configuration of the system of the first embodiment.

The configuration of the system of the first embodiment is described with reference to FIG. 3. FIG. 3 is a diagram for illustrating an example of the configuration of the system of the first embodiment.

A computer 300 is hardware for implementing the compression unit 103 and includes, for example, an arithmetic device 310, a switch 311, a memory 312, a frontend interface 313, and a backend interface 314.

The frontend interface 313 is an interface for coupling the computer 300 to the data generation source 100 and a management terminal 301. The backend interface 314 is an interface for coupling the computer 300 to a storage apparatus 302 and a network 303.

The arithmetic device 310 is a device that controls the overall computer 300, and is, for example, a general-purpose arithmetic device such as a central processing unit (CPU), an accelerator such as a graphical processing unit (GPU) and a field-programmable gate array (FPGA), or a hardware encoder/decoder of a standard codec such as HEVC, and may be a combination of those listed. The arithmetic device 310 is coupled to the memory 312 and the like via the switch 311.

The memory 312 stores therein a program to be executed by the arithmetic device 310 and information to be used by the program. The memory 312 is also used as a work area. In the memory 312 in the first embodiment, a compression program 330 for implementing the compression unit 103, pre-processing parameter management information 331, object type information 332, and object type definition information 333 are stored. The memory 312 includes an image feature cache 334. A program such as an operating system (OS) and information may be stored in the memory 312.

The program may be installed in advance on the computer 300, or the program stored in a non-transitory recording medium may be installed.

The storage apparatus 302 may be a block device formed of a hard disk drive (HDD) and a solid-state drive (SSD), a file storage, a content storage, or a volume constructed on a storage system, or may be implemented by any method of accumulating data. When it is not required to store compressed data, the storage apparatus 302 may be omitted.

The network 303 is a communication network such as a local area network (LAN) and the Internet. The compression unit 103 can transmit compressed data 104 to another device via the network 303. When it is not required to transmit compressed data 104 to another device, the network 303 may be omitted.

The compression unit 103 may be implemented by using a hardware device obtained by coupling hardware elements such as an integrated circuit (IC) to each other, or some functions of the compression unit 103 may be implemented by using one semiconductor element as an application-specific integrated circuit (ASIC) and an FPGA. Further, the compression unit 103 may be implemented by using a virtual machine (VM) implemented by virtualization technology. Still further, a component other than the components described here may be added.

The data generation source 100, the management terminal 301, the computer 300, and the storage apparatus 302 may be different hardware devices from each other, VMs operating on the same computer, different containers operating on the same operating system (OS), or applications operating on the same OS. Further, those components may be implemented by a combination of a plurality of implementation modes. For example, the data generation source 100 is an image sensor, the compression unit 103 is an edge device coupled to the image sensor and including the arithmetic device 310, the management terminal 301 is a terminal operable by a user, and the storage apparatus 302 is an HDD.

FIG. 4 is a table for showing an example of the data structure of the pre-processing parameter management information 331 in the first embodiment.

The pre-processing parameter management information 331 is data in the form of a table, for example, and stores therein an entry including a data generation source ID 401, a downscaling factor 402, and a downscaling algorithm 403. The fields included in the entry are merely an example and are not limited thereto.

The data generation source ID 401 is a field in which an identifier of a data generation source 100 is stored. The identifier of the data generation source 100 is, for example, a character string given by a user, a Media Access Control (MAC) address or an Internet Protocol (IP) address assigned to the data generation source 100, or any code that can identify the data generation source 100. When the data generation source 100 is obvious, the data generation source ID 401 may be omitted from the entry.

The downscaling factor 402 and the downscaling algorithm 403 are fields in which parameters for controlling conversion of an original frame are stored.

In the pre-processing parameter management information 331 shown in FIG. 4, the entry is set which defines pre-processing of reducing the vertical and horizontal lengths of an original frame of a data generation source A to 1/16 by using a bilinear algorithm.

The pre-processing parameter management information 331 may be set by a user via the management terminal 301, set by the arithmetic device 310 automatically at the time of startup of the compression unit 103 or addition of a new data generation source 100, or set by another method. For example, when the data generation source 100 is added, the arithmetic device 310 can check the codec of the encoder 125 and determine the downscaling factor based on the check result. When the codec of the encoder 125 is AVC and compression level information can be specified by a QP value in 16 pixels×16 pixels macroblock units, for example, the arithmetic device 310 can set 1/16 in the downscaling factor 402 based on information indicating that the encoder 125 is an AVC encoder.

The method of setting the various fields of the pre-processing parameter management information 331 is not limited thereto.

It suffices that the pre-processing parameter management information 331 has a data structure that can manage parameters related to frame conversion, and the pre-processing parameter management information 331 may have a data structure other than a table, for example, Extensible Markup Language (XML), YAML Ain't Markup Language (YAML), a hash table, and a tree structure.

FIG. 5 is a table for showing an example of the data structure of the object type information 332 in the first embodiment.

The object type information 332 is data in the form of a table, for example, and stores therein an entry including a data generation source ID 501 and an object type ID 502. The fields included in the entry are merely an example, and are not limited thereto.

The data generation source ID 501 is a field in which an identifier of a data generation source 100 is stored and is the same as the data generation source ID 401.

The object type ID 502 is a field in which an identifier representing an object type is stored. The identifier is a character string given by a user, for example, but is not limited thereto.

The object type information 332 manages the object type ID 502 of a detection target in video data generated by the data generation source 100 corresponding to the data generation source ID 501. For example, in the object type information 332 shown in FIG. 5, object type IDs "obj1" and "obj2" are set for a data generation source ID "A".

The information managed by the object type information 332 is not limited to the data generation source ID 501 and the object type ID 502. For example, parameters controlling a compression ratio and an image quality (e.g., a constant rate factor and a quantization parameter) when video data generated by the data generation source 100 corresponding to the data generation source ID 501 is compressed by the encoder 125 may be managed.

The data structure of the object type information 332 is not limited to a table, and may be a data structure other than a table, such as XML, YAML, a hash table, and a tree structure.

FIG. 6 is a table for showing an example of the data structure of the object type definition information 333 in the first embodiment.

The object type definition information 333 is data in the form of a table, for example, and stores therein an entry including an object type ID 601, an object type feature 602, an image quality parameter 603, and a peripheral parameter 604. The fields included in the entry are merely an example and are not limited thereto.

The object type ID 601 is a field in which an identifier of an object type is stored, and is the same as the object type ID 502.

The object type feature 602 is a field in which an object type vector representing the object type corresponding to the object type ID 601 is stored.

The image quality parameter 603 is a field in which a parameter specifying an image quality in compression of a region in which the object type corresponding to the object type ID 601 exists is stored.

For example, FIG. 6 shows an example in which an image quality is specified to three levels including High, Mid, and Low. However, the image quality parameter 603 is not limited thereto, and may be an offset value to be added to a QP value of AVC in the region in which the object type exists, for example. In this case, when −10 is specified as the image quality parameter for the object type ID "obj1", for example, the compression level information generation unit 124 generates −10 as an offset of a QP value (compression level information) for a macroblock of the region in which "obj1" exists, and the encoder 125 compresses a video by subtracting 10 from the QP value for this region. However, the definition of the image quality parameter 603 and the method of generating compression level information based on the image quality parameter are not limited thereto. For example, in a case in which the encoder 125 receives information specifying the degree of enhancement of image quality for each macroblock as the compression level information, that information may be managed as the image quality parameter.

The peripheral parameter 604 is a field in which a parameter for correcting a region for which the image quality is controlled with respect to the region in which the object type corresponding to the object type ID 601 exists is stored.

For example, enlarging a region for which the image quality is controlled with respect to the detected region can be performed as the correction method. For example, in the maintenance of a power transmission tower, it may be a requirement to leave not only a region in which the power transmission tower exists but also its peripheral region in high image quality in order to inspect whether branches of trees in the periphery have grown. In this case, the peripheral parameter 604 is a parameter representing the size of the peripheral region of the object type which is left in high image quality, for example, and is a parameter specifying how many pixels around the region including the object type are to be set as the region compressed with a high image quality in addition to the region including the object type, for example. However, the definition of the peripheral parameter 604 is not limited thereto. The peripheral parameter 604 may be any parameter related to the processing of correcting the region for which the image quality is controlled with respect to the region of the detection result.

The information managed by the object type definition information 333 is not limited to the object type ID 601, the object type feature 602, the image quality parameter 603, and the peripheral parameter 604. For example, trained parameters of the neural network of the image conversion unit 122 may be stored.

The data structure of the object type definition information 333 is not limited to a table, and may be a data structure other than a table, for example, XML, YAML, a hash table, and a tree structure.

A specific example of the information stored in the object type information 332 and the object type definition information 333 is described with reference to FIG. 5 and FIG. 6.

The object type information 332 shown in FIG. 5 shows that "obj1" and "obj2" are set as the object type IDs 502 for video data generated by the data generation source 100 to which "A" is assigned as the data generation source ID 501.

The object type definition information 333 shown in FIG. 6 shows that an object type vector 521 is set for the object type "obj1", "High" is set as the image quality parameter 603 for the region in which the object type "obj1" exists, and "10" is set as the peripheral parameter 604. For the object type "obj2," the setting contents are shown in a similar manner.

For example, in a case in which the object types "obj1" and "obj2" represent a power transmission tower and a wind turbine generator, respectively, information for compressing video data generated by the data generation source A in such a manner that a region in which the power transmission tower exists and 10 pixels around that region have the image quality "High" is set in the entry 611. In the entry 612, information for compressing the video data generated by the data generation source A in such a manner that a region in which the wind turbine generator exists and 20 pixels around that region have the image quality "Mid" is set.

Next, processing executed by the compression unit 103 is described with reference to FIG. 7 to FIG. 14.

Figure 7:
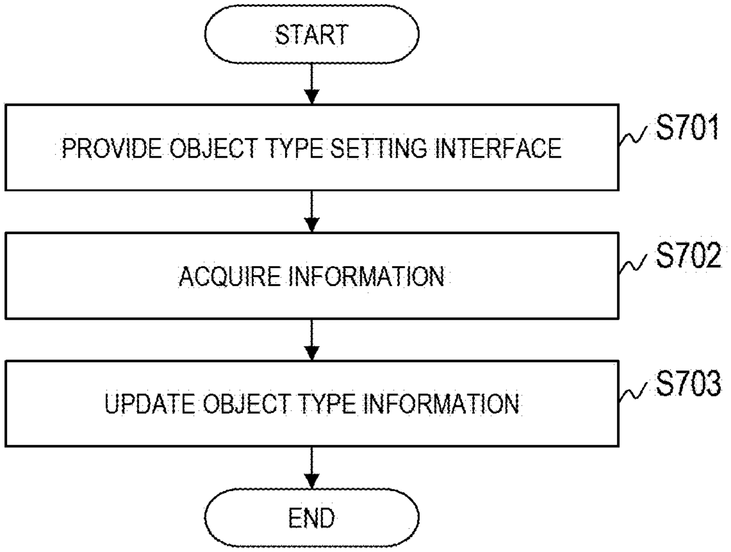
FIG. 7 is a flowchart for illustrating an example of processing of registration of the object type information 332 executed by the compression unit 103 in the first embodiment.
Figure 8:
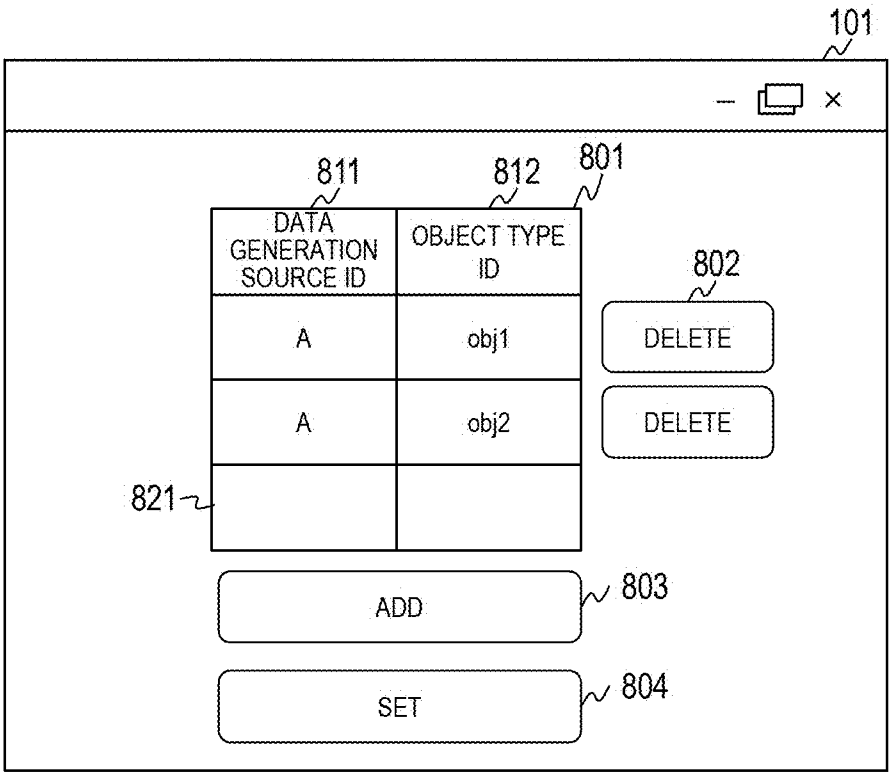
FIG. 8 is a diagram for illustrating an example of the object type setting interface 101 provided by the compression unit 103 in the first embodiment.

FIG. 7 is a flowchart for illustrating an example of processing of registration of the object type information 332 executed by the compression unit 103 in the first embodiment. FIG. 8 is a diagram for illustrating an example of the object type setting interface 101 provided by the compression unit 103 in the first embodiment.

In a case where the arithmetic device 310 functioning as the compression unit 103 receives a request from the management terminal 301 via the frontend interface 313, the arithmetic device 310 starts the processing described below. The trigger for execution of the processing is not limited to the above-mentioned trigger, and may be the startup of the computer 300, for example The arithmetic device 310 provides the object type setting interface 101 for setting an object type to the management terminal 301 via the frontend interface 313 (S701). Here, the object type setting interface 101 is described with reference to FIG. 8.

The object type setting interface 101 is displayed on a display device (not shown) of the management terminal 301. A user operates the object type setting interface 101 by using an input device (not shown) of the management terminal 301.

A table 801 is displayed on the object type setting interface 101. The table 801 is a table for confirmation and registration of an entry including a data generation source ID 811 and an object type ID 812. The data generation source ID 811 and the object type ID 812 are the same fields as the data generation source ID 501 and the object type ID 502. An entry registered in the object type information 332 may be displayed in the table 801.

A delete button 802 is an operation button for deleting an entry from the table 801. When the user operates the delete button 802, the corresponding entry is deleted from the object type information 332. Deletion of an entry of the object type information 332 may be made by an operation other than the operation of the delete button 802.

An add button 803 is an operation button for adding an entry to the table 801. An entry may be added automatically after a value is set in the last entry. In this case, the add button 803 is not required.

An entry 821 is an entry added by the operation of the add button 803. To the data generation source ID 811, the user can input a data generation source ID in text, for example. As the object type ID 812, the user may input a text directly, or a drop-down list may be displayed so as to allow the user to perform selection. The drop-down list includes an existing object type ID and "new." When "new" is selected, the arithmetic device 310 automatically generates an identifier and assigns the identifier.

A set button 804 is an operation button for registering the contents of the table 801 in the object type information 332. When the user operates the set button 804, the management terminal 301 transmits a registration request including the table 801 to the compression unit 103. The compression unit 103 receives the registration request via the frontend interface 313 and updates the object type information 332 in accordance with the contents of the table 801.

In the table 801 on the object type setting interface 101, another field not shown in FIG. 8 may be displayed. Examples of such a field include fields to which parameters controlling a compression ratio and an image quality when data generated by the data generation source 100 with the data generation source ID 501 assigned thereto is compressed by the encoder 125 (e.g., constant rate factor and quantization parameter) are input.

The object type setting interface 101 has been described above. The object type setting interface 101 is not limited to the interface illustrated in FIG. 8. Other information (not shown) may be displayed, the interface may be operated in a different manner, or the interface design may be different. The description returns to FIG. 7.

The arithmetic device 310 acquires the information input via the object type setting interface 101 (S702) and updates the object type information 332 based on the acquired information (S703). The arithmetic device 310 then ends the processing of registration of the object type information.

Figure 9:
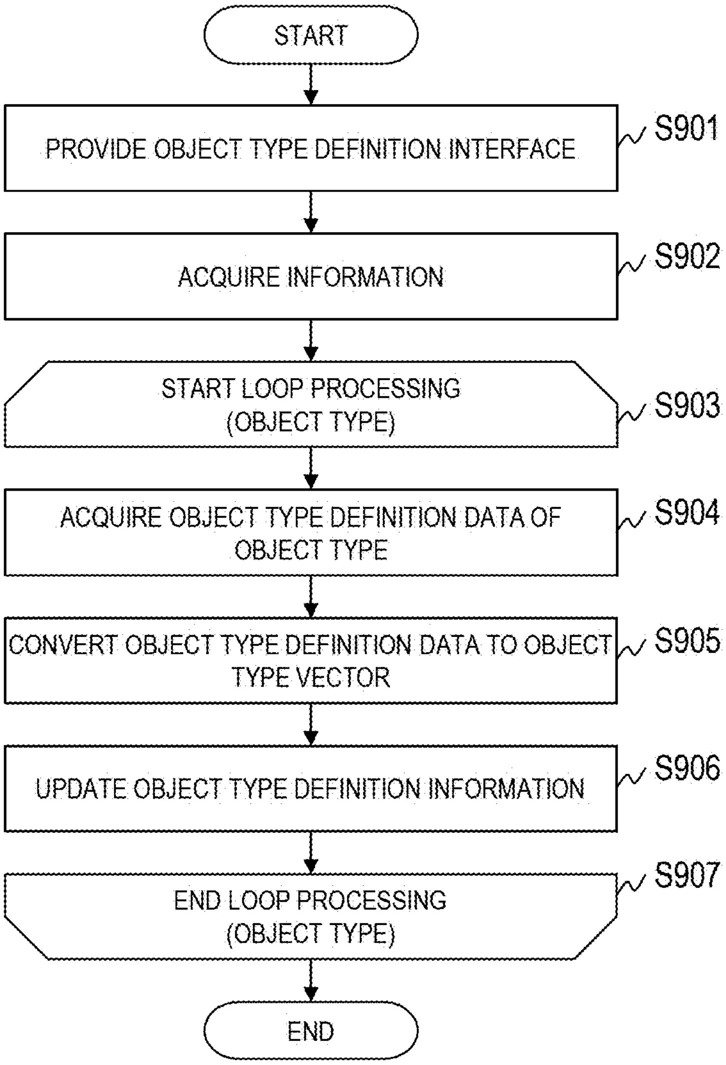
FIG. 9 is a flowchart for illustrating an example of processing of registration of the object type definition information 333 executed by the compression unit 103 in the first embodiment.
Figure 10:
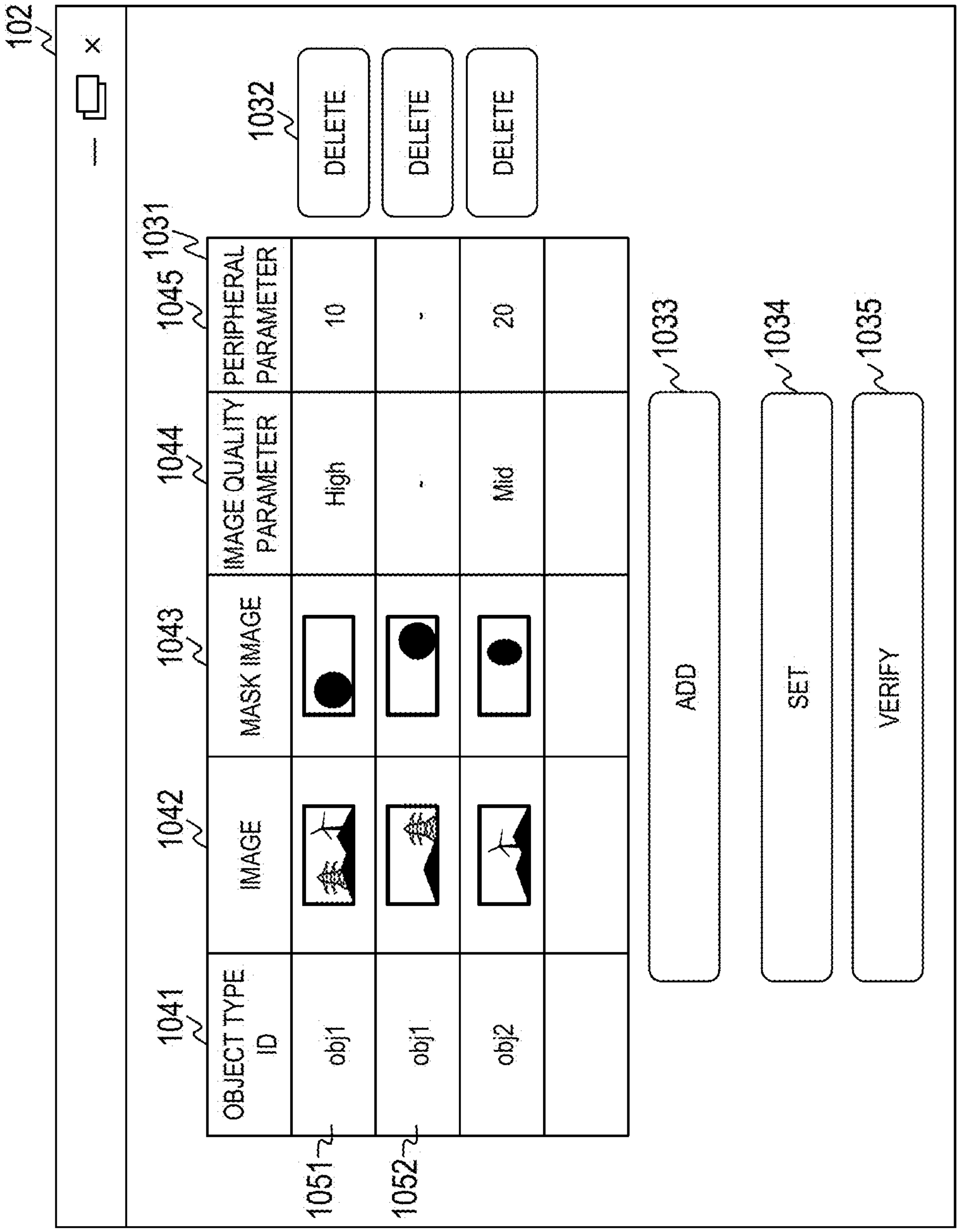
FIG. 10 and FIG. 11 are diagrams for illustrating examples of the object type definition interface 102 provided by the compression unit 103 in the first embodiment.
Figure 11:
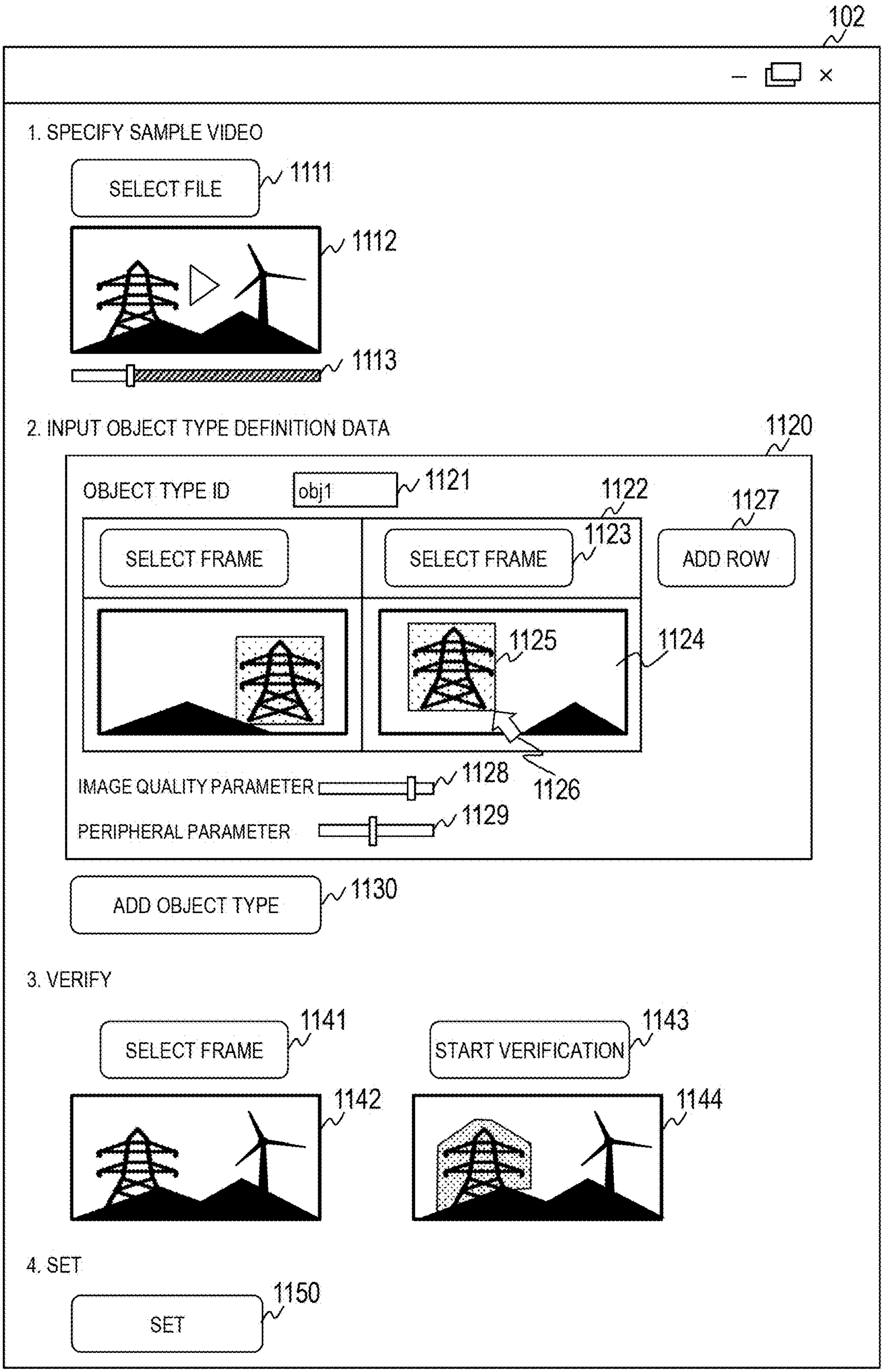

FIG. 9 is a flowchart for illustrating an example of processing of registration of the object type definition information 333 executed by the compression unit 103 in the first embodiment. FIG. 10 and FIG. 11 are diagrams for illustrating examples of the object type definition interface 102 provided by the compression unit 103 in the first embodiment.

In a case where the arithmetic device 310 functioning as the compression unit 103 receives a request from the management terminal 301 via the frontend interface 313, the arithmetic device 310 starts the processing described below. The trigger for execution of the processing is not limited to the above-mentioned trigger, and may be the startup of the computer 300, for example.

The arithmetic device 310 provides the object type definition interface 102 for setting the object type definition information 333 to the management terminal 301 via the frontend interface 313 (S901). Here, the object type definition interface 102 is described with reference to FIG. 10 and FIG. 11.

The object type definition interface 102 is displayed on the display device (not shown) of the management terminal 301. The user operates the object type definition interface 102 by using the input device (not shown) of the management terminal 301.

A table 1031 is displayed on the object type definition interface 102 illustrated in FIG. 10. The table 1031 is a table for confirmation and registration of an entry including an object type ID 1041, an image 1042, a mask image 1043, an image quality parameter 1044, and a peripheral parameter 1045. The object type ID 1041, the image quality parameter 1044, and the peripheral parameter 1045 are the same fields as the object type ID 601, the image quality parameter 603, and the peripheral parameter 604. An entry registered in the object type definition information 333 may be displayed in the table 1031.

A delete button 1032 is an operation button for deleting an entry from the table 1031. When the user operates the delete button 1032, the corresponding entry is deleted from the object type definition information 333. Deletion of an entry from the object type definition information 333 may be made by an operation other than the operation of the delete button 1032.

An add button 1033 is an operation button for adding an entry to the table 1031. An entry may be added automatically after a value is set in the last entry. In this case, the add button 1033 is not required.

The user can input an object type ID to the object type ID 1041 in text, for example. The object type ID(s) already set in the object type information 332 or the object type definition information 333 may be listed and displayed as a drop-down list so as to allow the user to select one object type ID.

To the image 1042 and the mask image 1043, an image and a mask image that form object type definition data defining a feature of the object type are input. The user may input a file path directly to the image 1042, or may be allowed to operate an operation button such as a browse button displayed in the field and to perform selection. To the mask image 1043, the user may directly input a mask image generated in advance. Alternatively, the user may be allowed to operate an operation button such as a browse button displayed in the field and to perform selection. Further, when the mask image 1043 is clicked, the management terminal 301 may display a drawing screen for a mask image, and the user may be allowed to draw a mask image representing a region in which the object type exists on that screen.

To the image quality parameter 1044, an image quality parameter for each object type is input. The user may be allowed to input the image quality parameter in text, or a list of compression parameters may be displayed in the form of a drop-down list or the like so as to allow the user to perform selection. To the peripheral parameter 1045, a peripheral parameter for each object type is input.

To the image quality parameter 1044, not only the image quality parameter for each object type is directly specified, but also other information for determining the image quality parameter may be input. For example, the user may be allowed to specify a target image quality in the region of the corresponding object type, and the management terminal 301 or the compression unit 103 may convert that specified value to the image quality parameter. Alternatively, the user may be allowed to specify a target image quality for each object type and a target bit rate of the entire video, and based on the specified information, the management terminal 301 or the compression unit 103 may determine an image quality parameter for each object type and a set value of a parameter (e.g., constant rate factor) set in the encoder 125.

A verify button 1035 is an operation button for verifying the contents of the table 1031. When the user operates the verify button 1035, the management terminal 301 transmits a request for verifying the table 1031 to the compression unit 103. The compression unit 103 receives the verification request via the frontend interface 313, verifies the contents of the table 1031, and sends the result as a response to the management terminal 301. The management terminal 301 displays the result. For example, the compression unit 103 executes the semantic segmentation processing on the image 1042 and sends a response that is an image obtained by visualizing the result, as the verification result. However, the specific content of the verification processing is not limited thereto. Further, the verification processing may be executed in the management terminal 301.

A set button 1034 is an operation button for registering the contents of the table 1031 in the object type definition information 333. When the user operates the set button 1034, the management terminal 301 transmits a registration request including the table 1031 to the compression unit 103. The compression unit 103 receives the registration request via the frontend interface 313 and updates the object type definition information 333 in accordance with the contents of the table 1031.

The object type definition interface 102 has been described above. The object type definition interface 102 is not limited to the interface illustrated in FIG. 10. Other information (not shown) may be displayed, the interface may be operated in a different manner, or the interface design may be different.

FIG. 11 shows another example of the object type definition interface 102.

First, the user operates a select file button 1111 to select a video file including an object type the user wants to specify. The selected video file is displayed in a video player field 1112. In the video player field 1112, the user can play and pause the video file. Further, the user can adjust the play time of the video file by using a play time bar 1113.

Next, the user specifies an object type in an object-type definition data input field 1120. To an object type ID field 1121, an object type ID is input in text, for example.

Next, the user operates the play time bar 1113 to cause a frame including a desired object type to be displayed in the video player field 1112. When the user operates a select frame button 1123 in this state, the image of that frame is displayed in a drawing field 1124.

The user draws a bounding box 1125 on the drawing field 1124 by using a cursor 1126. The user can draw a mask image by drawing the bounding box 1125 to surround the desired object type. For example, an image obtained by filling the inside of the bounding box drawn by the user can be set as the mask image.

However, the method of converting the bounding box to the mask image is not limited thereto. The largest object type included in that bounding box may be detected by deep learning or the like, and the detection result may be used as the mask image.

The method of allowing the user to specify the object type on the drawing field 1124 is not limited to drawing of the bounding box. For example, by clicking a part of that object type by means of the cursor 1126, the region of that object type may be detected by deep learning or the like, and the detection result may be used as the mask image.

The user can specify object type definition data formed of a pair of the image of that object type and the mask image by operating an add row button 1127.

The user can specify an image quality parameter and a peripheral parameter by operating an image-quality parameter specifying slide bar 1128 and a peripheral parameter slide bar 1129. The method of specifying the image quality in the region of the object type is not limited thereto. For example, the user may be allowed to specify a target image quality in the region of the object type by means of a slide bar, and the management terminal 301 or the compression unit 103 may convert the specified value to the image quality parameter. Alternatively, the user may be allowed to specify a target image quality for each object type and a target bit rate for the entire video, and based on the specified information, the management terminal 301 or the compression unit 103 may determine an image quality parameter for each object type and a set value of a parameter (e.g., constant rate factor) set in the encoder 125.

The user can add the object-type definition data input field 1120 by operating an add object type button 1130 and can define features of a plurality of object types.

When a select frame button 1141 of a verification function is operated, the frame displayed in the video player field 1112 can be displayed in a field 1142. When a start verification button 1143 is operated in this state, the management terminal 301 transmits a request for verifying the object-type definition data input field 1120 to the compression unit 103. The compression unit 103 receives the verification request via the frontend interface 313, executes the semantic segmentation processing by using the object type definition data specified in the object-type definition data input field 1120 and the image displayed in the field 1142 as inputs, visualizes the result, and sends the visualized result as a response. The verification result sent as the response is displayed in a visualized image 1144. The user can confirm whether the object type is specified as expected by viewing the visualized image 1144.

A set button 1150 is an operation button for registering the contents of the object-type definition data input field 1120 to the object type definition information 333. When the user operates the set button 1150, the management terminal 301 transmits a registration request including the object type ID, the image, the mask image, the image quality parameter, and the peripheral parameter to the compression unit 103. The compression unit 103 receives the registration request via the frontend interface 313 and updates the object type definition information 333 in accordance with the contents of the object-type definition data input field 1120.

The object type definition interface 102 illustrated in FIG. 11 may be divided into a plurality of screens. For example, the object-type definition data input field 1120 and the verification field may be displayed as separate screens from each other.

Returning to FIG. 9, the arithmetic device 310 acquires the information input via the object type definition interface 102 (S902).

The arithmetic device 310 starts loop processing for object type (S903). Specifically, the arithmetic device 310 selects one of the object type IDs 1041 included in the table 1031 acquired in Step S902. For example, in a case in which the table 1031 includes the object type IDs "obj1" and "obj2," the arithmetic device 310 selects any one of "obj1" and "obj2." In this case, the loop processing is performed twice.

The arithmetic device 310 acquires the object type definition data of the selected object type (S904). Specifically, the arithmetic device 310 acquires an entry having the object type ID 1041 that matches the identifier of the selected object type from the table 1031. For example, in a case in which the selected object type ID is "obj1," entries 1051 and 1052 are acquired.

The arithmetic device 310 converts the object type definition data to an object type vector (S905). Specifically, the arithmetic device 310 calculates an object type vector by using the image 1042 and the mask image 1043 of the entry acquired in Step S904.

In a case in which there are a plurality of entries acquired in Step S904, the arithmetic device 310 calculates one object type vector from each entry. In this case, the number of entries corresponds to the number of shots in the machine learning model 200 of semantic segmentation using the few-shot learning. In general, as the number of shots increases, the detection accuracy of the object type is improved.

The arithmetic device 310 updates the object type definition information 333 (S906). Specifically, the arithmetic device 310 adds an entry to the object type definition information 333, sets the identifier of the object type selected in Step S903 in the object type ID 601 of the added entry, and sets the parameters included in the object type definition data acquired in Step S904 in the image quality parameter 603 and the peripheral parameter 604. Further, the arithmetic device 310 sets the calculated object type vector in the object type feature 602 of the added entry.

In Step S907, the arithmetic device 310 determines whether the processing has been completed for all object types. In a case where the processing has not been completed for all the object types, the arithmetic device 310 returns the process to Step S903 and executes the same processing. In a case where the processing has been completed for all the object type, the arithmetic device 310 ends the processing of registering the object type definition information 333.

Re-learning processing such as fine-tuning may be performed for the whole or a part of the image conversion unit 122, the whole or a part of the object type definition data conversion unit 120, or both of the units. For example, between Step S902 and Step S903, re-learning can be performed by using the image 1042 and the mask image 1043 as training data. A parameter obtained by re-learning may be managed as object type definition data. Further, the image conversion unit 122, the object type definition data conversion unit 120, or both of the units may be re-trained for a plurality of object types by using the images 1042 and the mask images 1043 of a plurality of object type IDs 1041 corresponding to a certain data generation source ID as training data.

Figure 12:
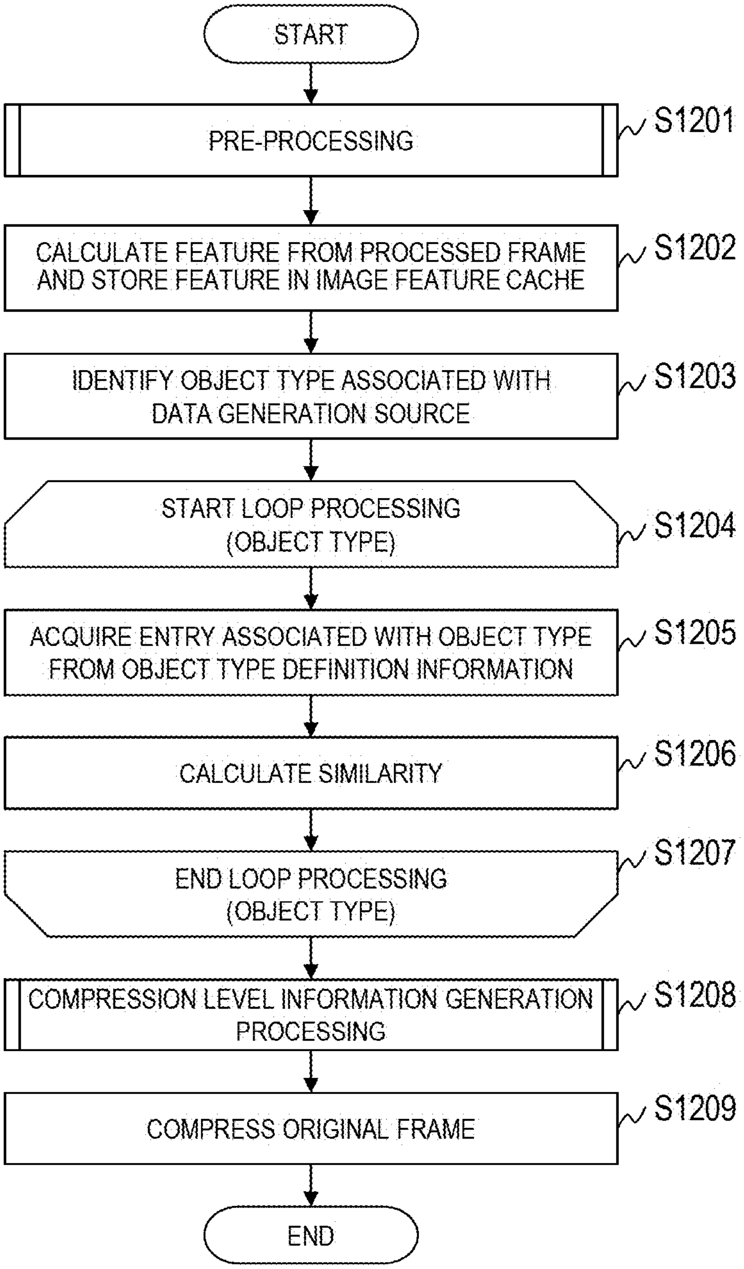
FIG. 12 is a flowchart for illustrating an example of compression processing executed by the compression unit 103 in the first embodiment.

FIG. 12 is a flowchart for illustrating an example of compression processing executed by the compression unit 103 in the first embodiment.

In a case where the arithmetic device 310 functioning as the compression unit 103 receives a new original frame via the frontend interface 313, for example, the arithmetic device 310 starts compression processing described below.

The arithmetic device 310 executes pre-processing for the acquired original frame (S1201). Details of the pre-processing are described with reference to FIG. 13. In the pre-processing, a processed frame is generated by executing pre-processing such as downscaling.

The arithmetic device 310 calculates the image feature 143 from the processed frame and stores the image feature 143 in the image feature cache 334 (S1202).

The arithmetic device 310 refers to the object type information 332 and identifies an object type associated with the data generation source 100 of the original frame (S1203).

For example, in a case of the object type information 332 shown in FIG. 5, the arithmetic device 310 searches for an entry in which the identifier of the data generation source 100 of the original frame is stored in the data generation source ID 501, and extracts the object type ID 502 of that entry. In a case in which the identifier of the data generation source 100 is "A", "obj1" and "obj2" are extracted.

The arithmetic device 310 starts loop processing for object type (S1204). Specifically, the arithmetic device 310 selects one of the object types identified in Step S1203. For example, in a case in which the object types identified in Step S1203 are "obj1" and "obj2," the arithmetic device 310 selects any one of "obj1" and "obj2." In this case, the loop processing is performed twice.

The arithmetic device 310 acquires an entry associated with the selected object type from the object type definition information 333 (S1205). For example, in a case in which the selected object type is "obj1," the arithmetic device 310 acquires the entry 611 from the object type definition information 333 of FIG. 6.

The arithmetic device 310 calculates similarity between an object type vector and the image feature 143 stored in the image feature cache 334 (S1206).

The calculation result of similarity is the detection result of the corresponding object type in the processed frame and is, for example, a two-dimensional tensor representing a probability that the object of that object type exists in each pixel of the processed frame.

In Step S1207, the arithmetic device 310 determines whether the processing has been completed for all the identified object types. In a case where the processing has not been completed for all the identified object types, the arithmetic device 310 returns the process to Step S1204 and executes the same processing.

In a case where the processing has been completed for all the identified object types, the arithmetic device 310 executes compression level information generation processing by using the detection result of each object type (S1208). Details of the compression level information generation processing are described with reference to FIG. 14.

The arithmetic device 310 generates compressed data 104 based on the original frame and compression level information (S1209). After that, the arithmetic device 310 transmits the compressed data 104 to the storage apparatus 302 or a device coupled thereto via the network 303, via the backend interface 314 and ends the processing.

Step S1201 to Step S1208 may be performed only once for a predetermined number of original frames, and compressed level information acquired by this execution may be reused in compression of those original frames. For example, Step S1201 to Step S1208 may be performed only for the n-th original frames counted from the top of the video data, where n is a multiple of 4, and the subsequent three frames may be compressed by using compression level information most recently calculated. The calculation amount per original frame can thus be reduced, and hence the compression speed is increased.

Figure 13:
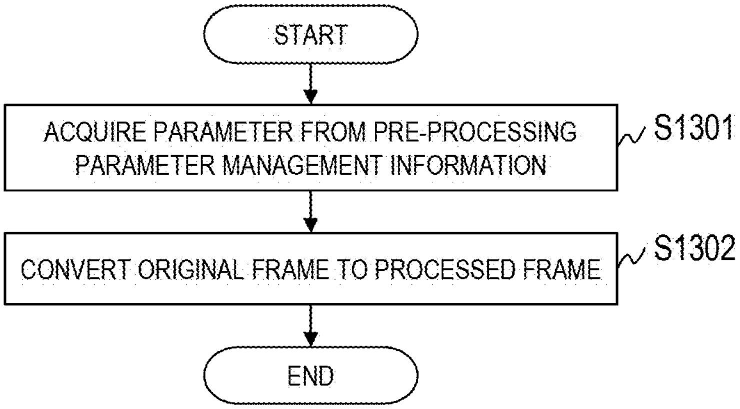
FIG. 13 is a flowchart for illustrating an example of the pre-processing executed by the compression unit 103 in the first embodiment.

FIG. 13 is a flowchart for illustrating an example of the pre-processing executed by the compression unit 103 in the first embodiment.

The arithmetic device 310 acquires a pre-processing parameter from the pre-processing parameter management information 331 (S1301). Specifically, the arithmetic device 310 refers to the pre-processing parameter management information 331 and searches for an entry in which the identifier of the data generation source 100 of the sender of the original frame is stored in the data generation source ID 401. The arithmetic device 310 acquires the parameters set in the downscaling factor 402 and the downscaling algorithm 403 of the entry.

The arithmetic device 310 converts the original frame to a processed frame based on the acquired parameters (S1302) and ends the pre-processing.

For example, in a case of the pre-processing parameter management information 331 shown in FIG. 4, a frame received from the data generation source A is converted based on the bilinear algorithm in such a manner that the vertical and horizontal lengths are reduced to 1/16.

Figure 14:
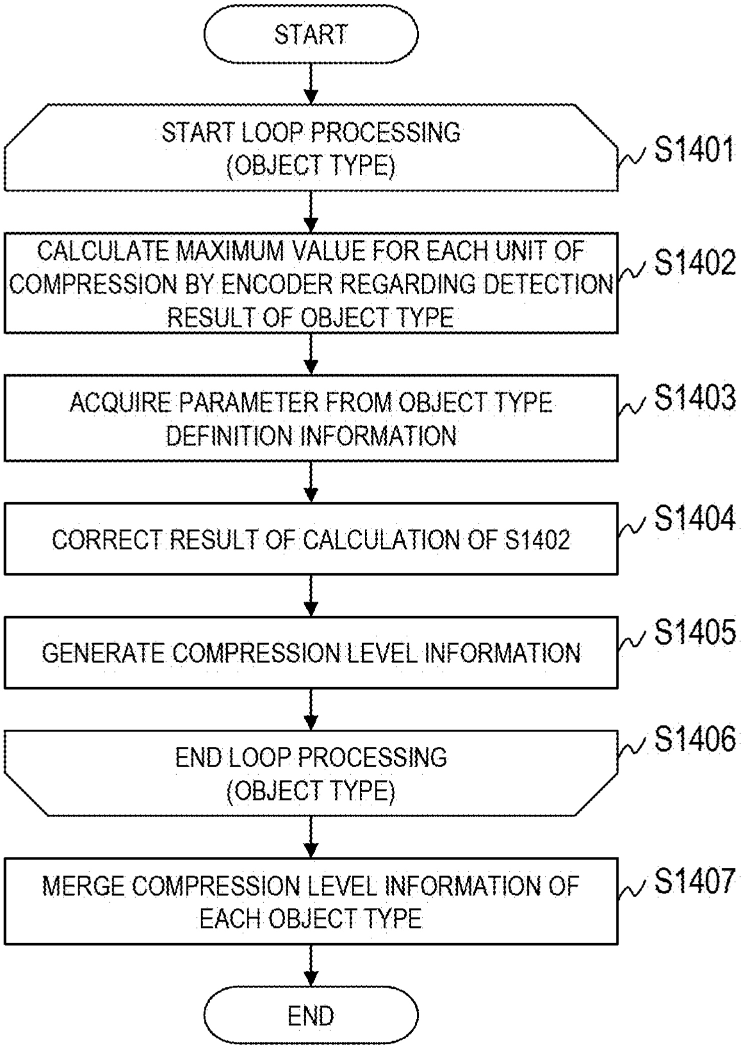
FIG. 14 is a flowchart for illustrating an example of the compression level information generation processing executed by the compression unit 103 in the first embodiment.

FIG. 14 is a flowchart for illustrating an example of the compression level information generation processing executed by the compression unit 103 in the first embodiment.

The arithmetic device 310 starts loop processing for object type (S1401). Specifically, the arithmetic device 310 selects one of the object types identified in Step S1203. For example, in a case where the object types identified in Step S1203 are "obj1" and "obj2," the arithmetic device 310 selects any one of "obj1" and "obj2." In this case, the loop processing is performed twice.

Regarding the detection result of the selected object type, the arithmetic device 310 calculates the maximum value for each unit of compression by the encoder 125 to obtain a new two-dimensional tensor (S1402).

For example, in a case in which the pre-processing parameter management information 331 is shown in FIG. 4, the object type definition information 333 is shown in FIG. 6, and the encoder 125 is for AVC with a macroblock size of 16×16, the two-dimensional tensor (the detection result) calculated in Step S1206 has a resolution corresponding to the number of AVC macroblocks in the original frame in a one-to-one manner, and therefore identity transformation is performed in Step S1402. For example, in a case in which the downscaling factor 402 of the pre-processing parameter management information 331 is ¼, the arithmetic device 310 applies max pooling to the two-dimensional tensor calculated in Step S1206 for each of 4×4 tiles, to thereby execute conversion in such a manner that each element of the two-dimensional tensor corresponds to a macroblock as the unit of compression in a one-to-one manner. The processing executed for each unit of compression in Step S1402 is not limited to calculation of the maximum value, and may be calculation of an average value or the like.

The arithmetic device 310 acquires a parameter for compression from the object type definition information 333 (S1403). Specifically, the arithmetic device 310 refers to the object type definition information 333 and searches for an entry in which the identifier of the selected object type is stored in the object type ID 601. The arithmetic device 310 acquires the parameters set in the image quality parameter 603 and the peripheral parameter 604 of the entry found in the search.

The arithmetic device 310 corrects the two-dimensional tensor calculated in Step S1402 based on the peripheral parameter (S1404).

For example, in a case in which a value of the peripheral parameter 604 is 32 and the encoder 125 is for AVC with a macroblock size of 16×16, correction is made which enlarges a region for which the image quality is controlled by peripheral two macroblocks from the region detected in Step S1206. Specifically, max pooling with a kernel size of 2×2 and a stride of 1 is applied to the two-dimensional tensor calculated in Step S1402. However, the processing of Step S1404 is not limited to max pooling.

In a case in which the value of the peripheral parameter 604 is not a multiple of the macroblock size (for example, the peripheral parameter 604 is 20 and the macroblock size is 16×16), an integer obtained by rounding up the result of division of the peripheral parameter by the size of one piece of the macroblock (for example, 2 in the above-mentioned case) may be used as the kernel size of max pooling so as to make a conservatively wide region have a predetermined image quality.

The processing of Step S1404 may be performed immediately before the processing of Step S1402. In this case, correction can be made to make the area of the region to be enlarged more accurate. Meanwhile, by executing the processing of Step S1404 after the processing of Step S1402 as described in the first embodiment, it suffices that max pooling is applied to the two-dimensional tensor that is lower in resolution than the original frame, and thus the processing can be performed at higher speed.

The arithmetic device 310 generates compression level information for the encoder 125 for the selected object type based on the two-dimensional tensor corrected in Step S1404 (S1405). An example of this generation processing is described below by way of, as an example, a case in which the encoder 125 is for AVC.

The first example of this generation processing is described by way of, as an example, a case in which the encoder 125 receives an offset of a QP value for each macroblock as compression level information. The arithmetic device 310 generates a map of offsets of QP values as the compression level information, in which for each element of the two-dimensional tensor, 0 is assigned as the offset of the QP value of the macroblock corresponding to that element in a case where the value of that element is smaller than a predetermined threshold value (for example, the threshold value is 0.5 in a case in which the range of the value of each element of the two-dimensional tensor is from 0 to 1), and a predetermined value determined from the image quality parameter acquired in Step S1403 is assigned as the offset of the QP value of the macroblock corresponding to that element in a case where the value of that element is equal to or larger than the threshold value. For example, in a case in which the image quality parameter represents the offset itself of the QP value, the value of the image quality parameter acquired in Step S1403 is set as the compression level information for the macroblock equal to or larger than the threshold value. Alternatively, a value obtained by multiplying the image quality parameter acquired in Step S1403 by a predetermined factor may be set as the offset of the QP value (the compression level information).

The second example of that generation processing is described by way of, as an example, a case in which the encoder 125 receives information specifying the degree of enhancement of the image quality for each macroblock as compression level information. For example, it is assumed that the encoder 125 receives specification of four levels including "High," "Mid," "Low," and "no enhancement" for each macroblock. The arithmetic device 310 generates the compression level information in which, for each element of the two-dimensional tensor, "no enhancement" is assigned to the macroblock corresponding to that element in a case where the value of that element is smaller than a predetermined threshold value (for example, the threshold value is 0.5 in a case in which the range of the value of each element of the two-dimensional tensor is from 0 to 1), and a value determined from the image quality parameter acquired in Step S1403 is assigned to the macroblock corresponding to that element in a case where the value of that element is equal to or larger than the threshold value. For example, in a case in which the image quality parameter is represented by three levels including "High," "Mid," and "Low," the value of the image quality parameter acquired in Step S1403 is set for the macroblock equal to or larger than the threshold value.

The method of converting the two-dimensional tensor calculated in Step S1404 to the compression level information is not limited thereto, and any processing can be performed as long as the processing can generate the compression level information by using the result of Step S1404. For example, the value of the compression level information may be controlled for each macroblock dynamically so as to improve the rate-distortion characteristics.

In Step S1406, the arithmetic device 310 determines whether the processing has been completed for all the identified object types. In a case where the processing has not been completed for all the identified object types, the arithmetic device 310 returns the process to Step S1401 and executes the same processing.

In a case where the processing has been completed for all the identified object types, the arithmetic device 310 merges the compression level information of the object types together (S1407).

For example, in a case in which a higher compression level means making an image quality higher in each unit of compression, the arithmetic device 310 obtains the maximum value of the compression level among the object types in each unit of compression. Thus, compression can be performed in such a manner that the image quality of the region in which each object type exists becomes the image quality represented by the image quality parameter 603 specified by the user or higher.

The arithmetic operation for aggregating two-dimensional tensors of compression level information for a plurality of object types into one two-dimensional tensor of compression level information is not limited to calculation of the maximum value, and may be calculation of an average value, for example.

As described above, according to the first embodiment, compatible compressed data can be generated at high speed because a standard codec is used. Through the use of the image conversion unit 122, the object type definition data conversion unit 120, and the similarity calculation unit 123 generated by the few-shot learning, it is no longer required to prepare learning data and perform re-learning in association with change of the definition of object type. Further, by inputting a processed frame for which pre-processing such as resolution reduction has been performed to the image conversion unit 122, the processing can be sped up.

Through the execution of the processing by the image conversion unit 122 and the processing by the object type definition data conversion unit 120 at different timings independently of each other, the number of executions of a neural network in the compression processing can be suppressed, and thus the compression processing can be sped up.

Second Embodiment

In a second embodiment of this invention, the method of managing object type definition data is different from that in the first embodiment. The following description of the second embodiment focuses on the difference from the first embodiment.

Figure 15:
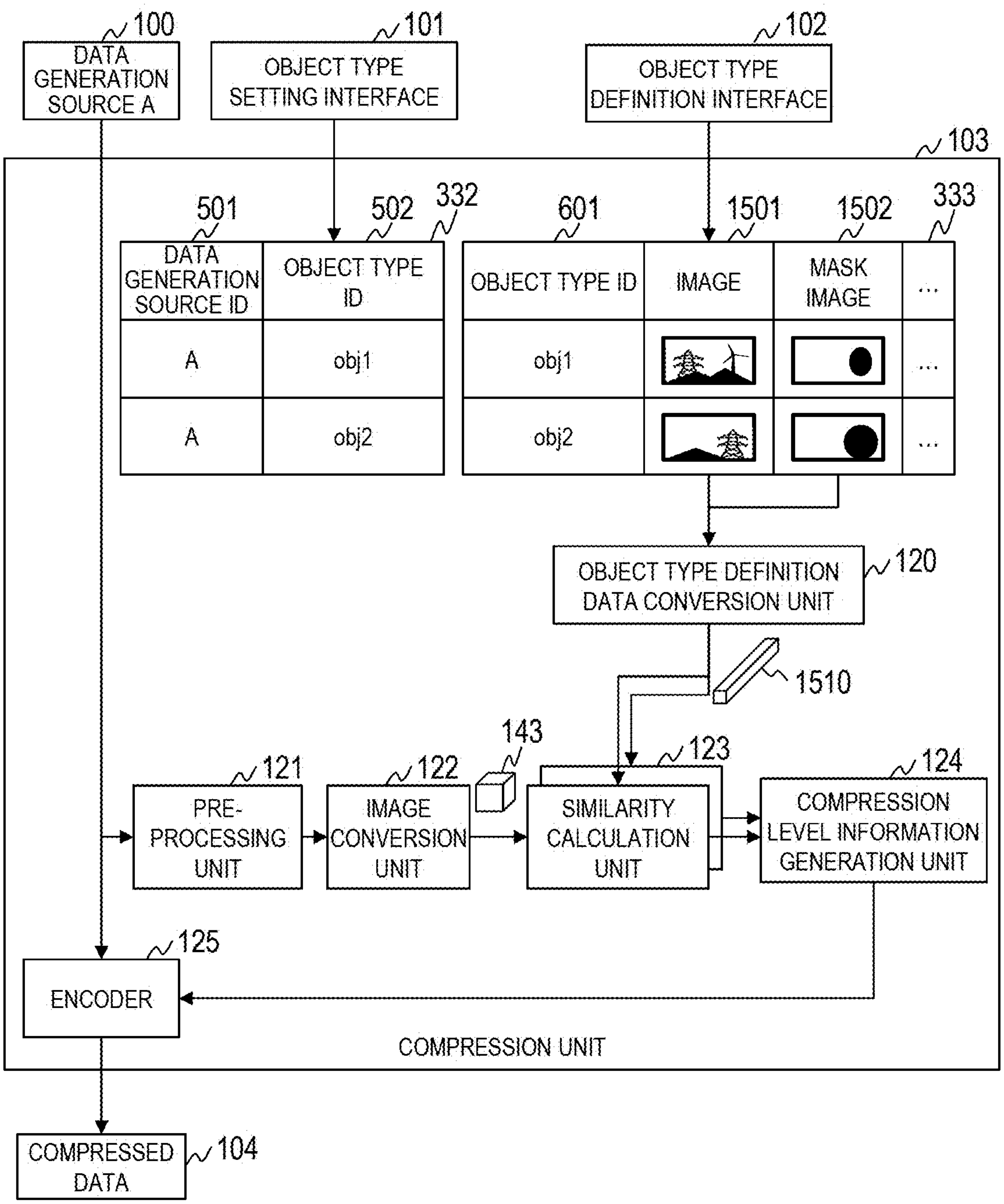
FIG. 15 is an explanatory diagram of the outline of a system of the second embodiment.

FIG. 15 is an explanatory diagram of the outline of a system of the second embodiment.

The functional configuration of the compression unit 103 in the second embodiment is the same as that in the first embodiment. The object type information 332 in the second embodiment has the same data structure as that in the first embodiment.

In the second embodiment, the data structure of the object type definition information 333 is different. The object type definition information 333 in the second embodiment includes an image 1501 and a mask image 1502, in place of the object type feature 602. The other field structure is the same as that in the first embodiment. In the second embodiment, an image and a mask image input via the object type definition interface 102 are managed as they are.

In the processing of registering the object type definition information 333 in the second embodiment, the arithmetic device 310 does not execute the processing of Step S905 and registers the input object type definition data in the object type definition information 333.

The object type definition data conversion unit 120 calculates an object type vector by using the image and the mask image at any timing.

For example, in a case of receiving the first frame from the data generation source 100, the object type definition data conversion unit 120 generates an object type vector 1510 from object type definition data of the object type corresponding to that data generation source 100 and stores the generated object type vector 1510 in a cache (not shown). Thus, the same data can be reused in frame compression.

Alternatively, the following processing may be performed. The object type feature 602 is provided in an entry of the object type definition information 333, as in the first embodiment, and null is set as a default value. In the compression processing, in a case in which the object type feature 602 in the entry corresponding to the data generation source 100 is null, the image conversion unit 122 causes the object type definition data conversion unit 120 to execute the processing, stores an object type vector in the object type feature 602, and inputs the object type vector to the similarity calculation unit 123. In a case in which the object type feature 602 of the entry corresponding to the data generation source 100 is not null, the image conversion unit 122 inputs the object type vector set in the object type feature 602 to the similarity calculation unit 123.

The trigger for execution of the processing of calculating the object type vector is not limited thereto.

According to the second embodiment, update of an image and a mask image can be flexibly handled. In addition, by leaving raw data (an image and a mask image) used for calculation of an object type vector, it is possible to review various settings.

This invention can be used for compression of various types of multidimensional data other than images such as a still image and a video, for example, sensor data including a sensor value and time.

The present invention is not limited to the above embodiment and includes various modification examples. In addition, for example, the configurations of the above embodiment are described in detail so as to describe the present invention comprehensibly. The present invention is not necessarily limited to the embodiment that is provided with all of the configurations described. In addition, a part of each configuration of the embodiment may be removed, substituted, or added to other configurations.

A part or the entirety of each of the above configurations, functions, processing units, processing means, and the like may be realized by hardware, such as by designing integrated circuits therefor. In addition, the present invention can be realized by program codes of software that realizes the functions of the embodiment. In this case, a storage medium on which the program codes are recorded is provided to a computer, and a CPU that the computer is provided with reads the program codes stored on the storage medium. In this case, the program codes read from the storage medium realize the functions of the above embodiment, and the program codes and the storage medium storing the program codes constitute the present invention. Examples of such a storage medium used for supplying program codes include a flexible disk, a CD-ROM, a DVD-ROM, a hard disk, a solid state drive (SSD), an optical disc, a magneto-optical disc, a CD-R, a magnetic tape, a non-volatile memory card, and a ROM.

The program codes that realize the functions written in the present embodiment can be implemented by a wide range of programming and scripting languages such as assembler, C/C++, Perl, shell scripts, PHP, Python and Java.

It may also be possible that the program codes of the software that realizes the functions of the embodiment are stored on storing means such as a hard disk or a memory of the computer or on a storage medium such as a CD-RW or a CD-R by distributing the program codes through a network and that the CPU that the computer is provided with reads and executes the program codes stored on the storing means or on the storage medium.

In the above embodiment, only control lines and information lines that are considered as necessary for description are illustrated, and all the control lines and information lines of a product are not necessarily illustrated. All of the configurations of the embodiment may be connected to each other.

What is claimed is:

1. A computer system, comprising a processor, a storage device coupled to the processor, and a coupling device, coupled to the processor, for being coupled to an external device, wherein the processor is configured to execute:

first processing of calculating, by using object type definition data defining an object type as a detection target in a space defined by a dimension of processing data extracted in a plane of the dimension from multidimensional data as a compression target, a first feature of the object type;

second processing of acquiring the processing data and calculating a second feature of the processing data;

third processing of estimating an important region of the space of the processing data, in which the object type exists, by using the first feature and the second feature;

fourth processing of generating compression level information including a parameter for determining a data amount of each of the important region and a region other than the important region; and fifth processing of generating compressed data by converting the processing data to a data format of which compatibility is ensured with a transmission destination of the compressed data by lossy compression using the compression level information.

2. The computer system according to claim 1, wherein, in the fifth processing, the processor is configured to generate the compressed data in which the data amount of the important region of the processing data is large and the data amount of the region other than the important region is small.

3. The computer system according to claim 1, wherein the processor is configured to:

calculate the first feature of each of a plurality of the object types in the first processing; and execute the third processing and the fourth processing for the each of the plurality of the object types.

4. The computer system according to claim 3, wherein the processor is configured to determine the parameter for each region of the space of the processing data by using the compression level information for the each of the plurality of the object types and then execute the fourth processing.

5. The computer system according to claim 2, wherein, in the first processing, the processor is configured to receive the object type definition data, calculate the first feature from the object type definition data, and store the first feature in the storage device.

6. The computer system according to claim 5, wherein the processor is configured to present an interface for setting the object type definition data.

7. The computer system according to claim 6, wherein the multidimensional data is a video, wherein the processing data is a frame image, and wherein the interface is an interface for setting a pair of a reference image including the object type and an annotation image indicating a region of the object type included in the reference image, as the object type definition data.

8. The computer system according to claim 7, wherein the interface allows reception, from a user, of an operation of specifying the region of the object type included in the reference image, and wherein the processor is configured to generate the annotation image based on the operation.

9. The computer system according to claim 2, wherein the processor is configured to:

receive the object type definition data and store the object type definition data in the storage device before execution of the first processing; and calculate the first feature from the object type definition data stored in the storage device in the first processing.

10. The computer system according to claim 2, wherein the processor is configured to correct the important region in the fourth processing.

11. The computer system according to claim 2, wherein, in the third processing, the processor is configured to calculate a probability that the object type exists in the space of the processing data based on the first feature and the second feature.

12. A non-transitory computer-readable storage medium storing program, which is executed by a computer, the computer including a processor, a storage device coupled to the processor, and a coupling device, coupled to the processor, for being coupled to an external device, the program causing the computer to execute:

first processing of calculating, by using object type definition data defining an object type as a detection target in a space defined by a dimension of processing data extracted in a plane of the dimension from multidimensional data as a compression target, a first feature of the object type;

second processing of acquiring the processing data and calculating a second feature of the processing data;

third processing of estimating an important region of the space of the processing data, in which the object type exists, by using the first feature and the second feature;

fourth processing of generating compression level information including a parameter for determining a data amount of each of the important region and a region other than the important region; and fifth processing of generating compressed data by converting the processing data to a data format of which compatibility is ensured with a transmission destination of the compressed data by lossy compression using the compression level information.

13. The non-transitory computer-readable storage medium according to claim 12, wherein, in the fifth processing, the program causes the computer to generate the compressed data in which the data amount of the important region of the processing data is large and the data amount of the region other than the important region is small.

14. The non-transitory computer-readable storage medium according to claim 12, wherein the program causes the computer to:

calculate the first feature of each of a plurality of the object types in the first processing; and execute the third processing and the fourth processing for the each of the plurality of the object types.

15. The non-transitory computer-readable storage medium according to claim 14, wherein the program causes the computer to execute processing of determining the parameter for each region of the space of the processing data by using the compression level information for the each the plurality of the object types and then execute the fourth processing.

16. The non-transitory computer-readable storage medium according to claim 13, wherein the program causes the computer to, in the first processing, receive the object type definition data, calculate the first feature from the object type definition data, and store the first feature in the storage device.

17. The non-transitory computer-readable storage medium according to claim 13, wherein the program causes the computer to:

execute processing of receiving the object type definition data and storing the object type definition data in the storage device before execution of the first processing; and calculate the first feature from the object type definition data stored in the storage device in the first processing.

18. A data compression method, which is executed by a computer system, the computer system including a processor, a storage device coupled to the processor, and a coupling device, coupled to the processor, for being coupled to an external device, the data compression method including:

a first step of calculating, by the processor, by using object type definition data defining an object type as a detection target in a space defined by a dimension of processing data extracted in a plane of the dimension from multidimensional data as a compression target, a first feature of the object type;

a second step of acquiring, by the processor, the processing data and calculating a second feature of the processing data;

a third step of estimating, by the processor, an important region of the space of the processing data, in which the object type exists, by using the first feature and the second feature;

a fourth step of generating, by the processor, compression level information including a parameter for determining a data amount of each of the important region and a region other than the important region; and a fifth step of generating, by the processor, compressed data by converting the processing data to a data format of which compatibility is ensured with a transmission destination of the compressed data by lossy compression using the compression level information.

19. The data compression method according to claim 18, wherein the fifth step includes generating, by the processor, the compressed data in which the data amount of the important region of the processing data is large and the data amount of the region other than the important region is small.

20. The data compression method according to claim 18, wherein the first step includes calculating, by the processor, the first feature of each of a plurality of the object types, and wherein the third step and the fourth step are executed for the each of the plurality of the object types.

* * * * *